United States Patent
Young et al.

(10) Patent No.: US 7,049,974 B2
(45) Date of Patent: *May 23, 2006

(54) VEHICLE OCCUPANT SENSING SYSTEM HAVING SENSORS WITH FORMED TERMINALS

(75) Inventors: Oliver J. Young, Grosse Pointe Farms, MI (US); John F. Nathan, White Lake Township, MI (US); Christopher T. Ricard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/749,154

(22) Filed: Dec. 30, 2003

(65) Prior Publication Data

US 2004/0262960 A1  Dec. 30, 2004

Related U.S. Application Data (63) Continuation-in-part of application No. 10/606,649, filed on Jun. 26, 2003.

(51) Int. Cl.
*B60R 21/01* (2006.01)
*G01G 7/02* (2006.01)

(52) U.S. Cl. .................. 340/667; 180/273; 280/735; 177/210 EM; 324/207.2

(58) Field of Classification Search ............. 340/667; 280/735; 180/273; 177/210 EM; 324/207.2
See application file for complete search history.

(56) References Cited

U.S. PATENT DOCUMENTS

| | | | |
|---|---|---|---|
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,594,222 A | 1/1997 | Caldwell | 200/600 |
| 5,653,462 A | 8/1997 | Breed et al. | 280/735 |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |

(Continued)

FOREIGN PATENT DOCUMENTS

EP  0 689 967 A1  3/1996

(Continued)

*Primary Examiner*—Jeffery Hofsass
*Assistant Examiner*—Anne V. Lai
(74) *Attorney, Agent, or Firm*—Bill Panagos (57) ABSTRACT

A vehicle occupant sensing system including a circuit carrier, an electric circuit with leads, and a sensor with a body and a plurality of formed terminals. Each of the terminals has a lower portion spaced a predetermined distance away from a plane defined by the bottom surface of the body. Moreover, the system has a plurality of conductive connectors each including a blade extending into the circuit carrier and into electrical communication with a lead of the electric circuit. The body is supported on the circuit carrier, and the terminals are supported by the top end of the connector. Also included is a method of manufacturing the same. The formed terminals allow the sensor to be more easily positioned relative to the connector, thereby facilitating assembly. Also, the connectors support the terminals when the connector attaches to the terminal, thereby inhibiting damage to the terminals that could otherwise occur.

18 Claims, 4 Drawing Sheets

U.S. PATENT DOCUMENTS

| | | | |
|---|---|---|---|
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A * | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,605,877 B1 | 8/2003 | Patterson et al. | 307/10.1 |
| 6,609,054 B1 | 8/2003 | Wallace | 701/45 |
| 6,932,382 B1 * | 8/2005 | Hayes et al. | 280/735 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 * | 11/2003 | Saunders et al. | 702/173 |

FOREIGN PATENT DOCUMENTS

| | | |
|---|---|---|
| WO | WO 98/41424 | 3/1997 |

* cited by examiner

VEHICLE OCCUPANT SENSING SYSTEM HAVING SENSORS WITH FORMED TERMINALS

CROSS-REFERENCE TO RELATED APPLICATIONS

This application is a continuation-in-part of U.S. Ser. No. 10/606,649, entitled "Encapsulated Spring Sensor Assembly" and filed Jun. 26, 2003.

BACKGROUND OF INVENTION

1. Field of the Invention

The present invention relates generally to a vehicle occupant sensing system, and more particularly to a vehicle occupant sensing system having sensors with formed terminals.

2. Description of Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the airbags were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause the occupant.

It can be appreciated that these occupant sensing systems provide valuable data, allowing the vehicle safety systems to function more effectively to reduce injuries to vehicle occupants.

One necessary component of each of the known systems discussed above includes some means for sensing a condition of the seat, such as whether or not it is occupied or whether the occupant is sitting in a certain position. One such sensing means may include a sensor device supported within the lower seat cushion of the vehicle seat. For example, U.S. published patent application having U.S. Ser. No. 10/249,527 and Publication No. US2003/0196495 A1, filed in the name of Saunders et al., discloses a method and apparatus for sensing seat occupancy including a sensor/emitter pair that is supported within a pre-assembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also electrically connected to a flexible circuit and supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor that is electrically connected to the flexible circuit, and the processor receives the sensor signals and interprets the signals to produce an output to indicate the presence of an occupant in the seat.

While the Saunders et al. occupant seat sensing system teaches a sensor/emitter pair that may sense the presence of a vehicle seat occupant, it suffers from certain disadvantages. Specifically, the electrical connection used to operatively establish electrical communication between the sensors and the flexible circuit is delicate and therefore fragile. The sensor system is subject to forces that are generated by occupants of various weights. These forces can act to break or otherwise disrupt the electrical connection between the circuit and the sensor. Also, sensor systems are typically subject to extreme temperatures, exposure to corrosives, and long operating lifetimes, and these operating conditions can increase the likelihood of electrical disconnection between the circuit and the sensor. Accordingly, there remains a need in the art for a vehicle occupant sensing system that includes a plurality of sensors electrically connected to an electrical circuit in a robust fashion such that the system can withstand the complex, fluctuating forces and extreme operating conditions that a vehicle seat typically endures.

SUMMARY OF INVENTION

The present invention overcomes the disadvantages of the related art in a vehicle occupant sensing system for detecting a condition of a vehicle seat. The system includes a circuit carrier with an upper surface. The system also includes an electric circuit supported by the circuit carrier. The electric circuit presents a plurality of leads. Furthermore, the system includes a sensor adapted to detect the condition of the vehicle seat. The sensor has a body with a bottom surface, which is supported by the upper surface of the circuit carrier. The sensor also has a plurality of formed terminals corresponding to the plurality of leads presented by the electric circuit. Each of the plurality of formed terminals has a lower portion which is spaced a predetermined distance away from a plane defined by the bottom surface of the body. Moreover, the vehicle occupant sensing system has a plurality of conductive connectors associated with the corresponding plurality of formed terminals and leads. The conductive connectors operatively support the terminals and establish electrical communication between the terminals and the leads.

Another aspect of the present invention is a method of assembling a vehicle occupant sensing system for detecting a condition of a vehicle seat. The vehicle occupant sensing system includes a circuit carrier with an upper surface and an electric circuit supported by the circuit carrier. The electric circuit presents a plurality of leads. The vehicle occupant sensing system also includes a sensor adapted to detect the condition of the vehicle seat. The sensor has a body with a bottom surface, and the sensor has a plurality of terminals corresponding to the plurality of leads presented by the electric circuit. The system also includes a plurality of conductive connectors associated with the corresponding plurality of terminals and leads. The method of assembly comprises multiple steps, including forming the terminals until spaced a predetermined distance away from a plane defined by the bottom surface of the body. The method continues by electrically attaching the conductive connectors to corresponding ones of said leads. Then, the method continues by electrically attaching the terminals to corresponding ones of the conductive connectors.

Another aspect of the present invention is a method of assembling a vehicle occupant sensing system. The method of assembly is similar to the method described above, except that the sequence of steps of the assembly method is changed. Specifically, the method starts by forming the terminals until spaced a predetermined distance away from a plane defined by the bottom surface of the body. Then, the method continues by electrically attaching the terminals to corresponding ones of said conductive connectors. Next, the method continues by electrically attaching the conductive connectors to corresponding ones of the leads.

One advantage of the present invention is that the formed terminals allow the sensor to be more easily positioned relative to the conductive connector, thereby facilitating assembly. Another advantage of the present invention is that the conductive connectors support the terminals when the conductive connector attaches to the terminal. This feature inhibits damage to the terminals that could otherwise occur during assembly.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
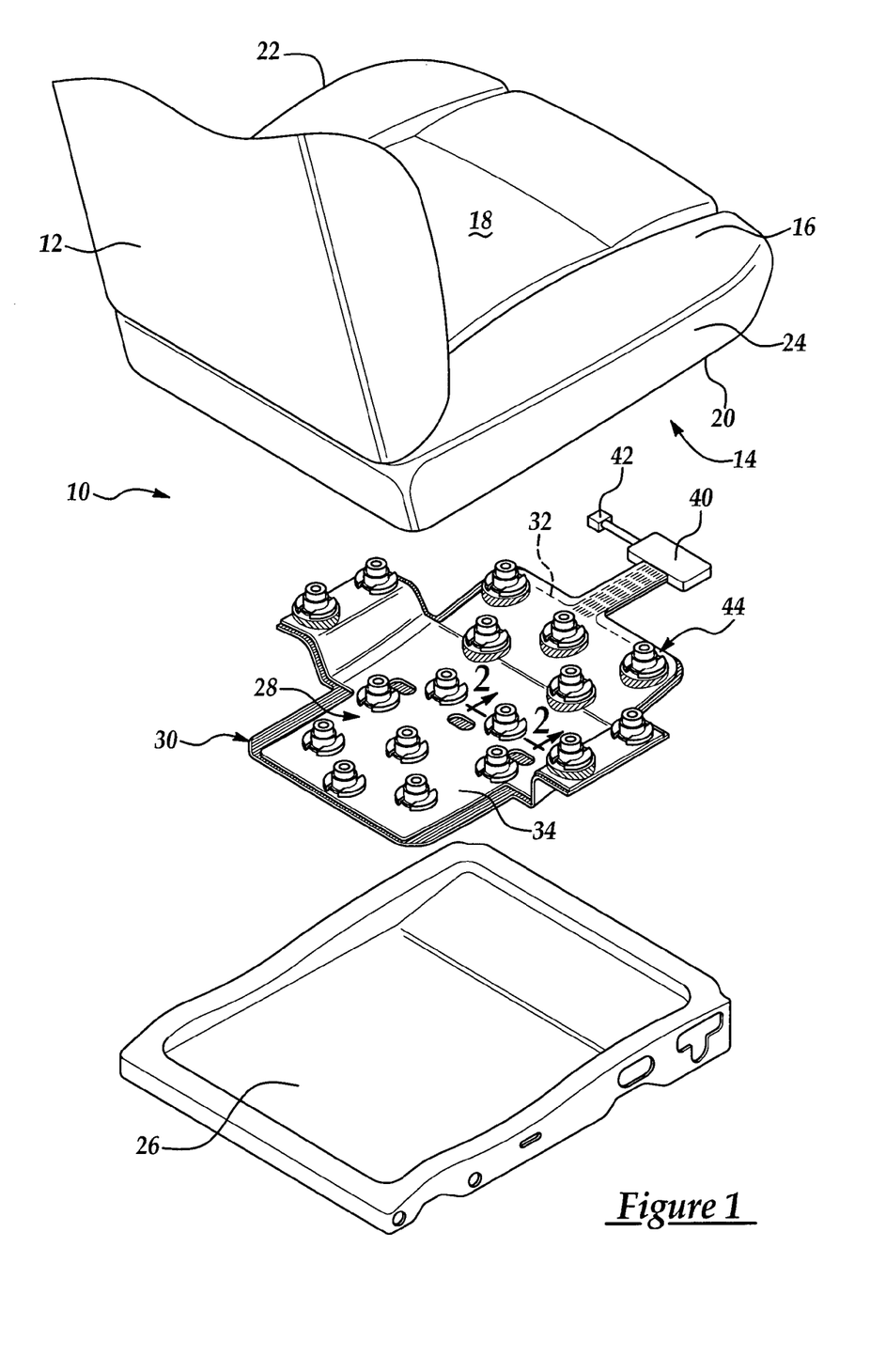
FIG. 1 is an exploded view of a vehicle seat assembly illustrating one embodiment of the vehicle occupant sensing system of the present invention.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement or whether the occupant is sitting in a certain position.

Figure 3:
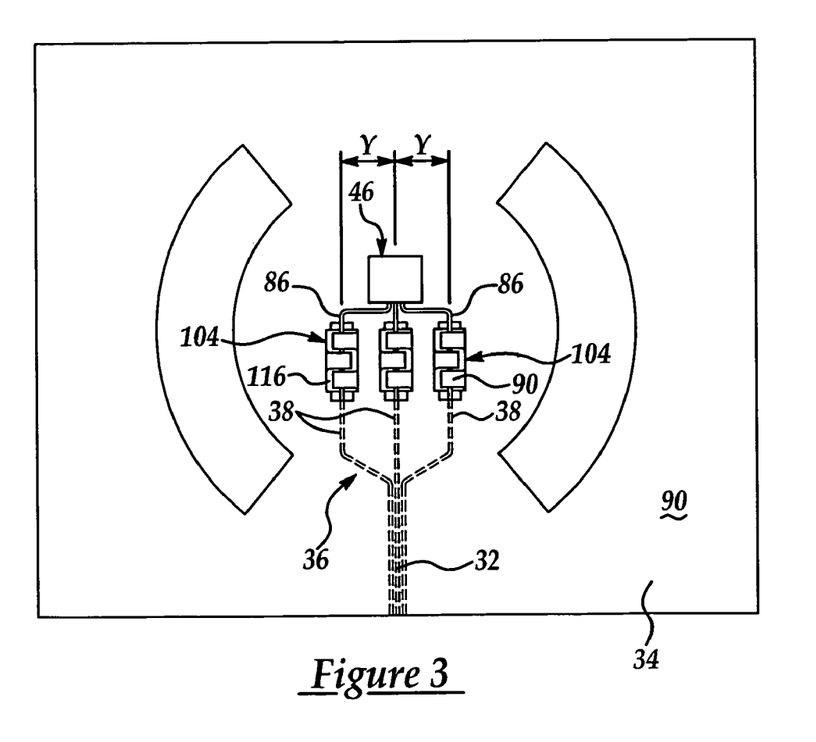
FIG. 3 is a top plan view of the sensor employed in conjunction with the sensor assembly and illustrating the conductive connector mounted to the circuit carrier and operatively establishing electrical communication with each terminal of the sensor.

The sensing system 28 includes a circuit carrier tray, generally indicated at 30, that is supported by the seat pan 26. The vehicle occupant sensing system 28 also includes an electric circuit 32, which, in turn, is supported by a circuit carrier 34. The circuit carrier 34 is made of a thin nonconductive and corrosion-resistant material, and it encapsulates known electrical components that form the electric circuit 32. For instance, in one embodiment, a flexible printed circuit forms the circuit carrier 34 and electric circuit 32. The tray 30 supports the circuit carrier 34. The electric circuit 32 has a plurality of terminal ends 36 spaced intermittently about the circuit carrier 34, one of which is shown in FIG. 3. Each of the terminal ends 36 of the electric circuit 32 presents a plurality of leads 38 discussed in greater detail below. In the embodiment shown in FIG. 3, there are three leads 38 at each terminal end 36, each embedded within the nonconductive material of the circuit carrier 34. The leads 38 have a pre-determined Y-axis spacing represented by dimension Y in FIG. 3.

The electric circuit 32 is electrically connected to a controller schematically illustrated at 40 in FIG. 1. As described in greater detail below, the electric circuit 32 carries electric signals generated by the vehicle occupant sensing system 28 to the controller 40. The controller 40 is electrically attached to a restraint system, schematically illustrated at 42 in FIG. 1. The restraint system 42 can be of many types, such as an air bag system, and the controller 40 sends output to the restraint system 42 based on the signals delivered by the electric circuit 32. Although an airbag restraint system is discussed here, one having ordinary skill in the art will recognize that the type of restraint system 42 connected to the controller 40 does not limit the scope of the present invention.

As shown, the system 28 also includes a plurality of low profile sensor assemblies 44 that are supported by the tray 30, below the lower surface 20 of the seat cushion 16. In one embodiment not shown, the lower surface 20 includes a plurality of depressions, and each of the low profile sensor assemblies 44 are spaced according to a corresponding depression formed in the lower surface 20 of the seat cushion 16.

Figure 2:
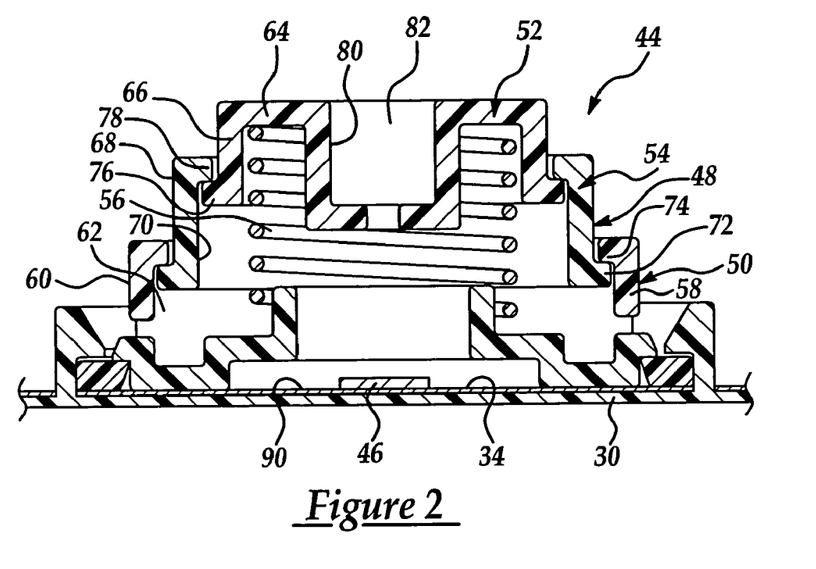
FIG. 2 is a cross-sectional side view of the sensor assembly employed in the vehicle occupant sensing system of the present invention taken along line 2—2 of FIG. 1.

As noted above, the vehicle occupant sensing system 28 further includes at least one sensor 46. As shown in FIGS. 2 and 3, the sensor 46 is operatively supported by the circuit carrier 34 adjacent the sensor assembly 44. In the embodiment shown here, the sensor 46 is positioned below the base 50 of the sensor assembly 44, above one of the terminal ends 36 of the electric circuit 32. The sensor 46 can be one of many types, including but not limited to a Hall effect sensor. If the sensor 46 is a Hall effect sensor, it detects the change in magnetic flux caused by the movement of the emitter 82 within the upper slide member 52 of the sensor assembly 44, and the sensor 46 generates a signal correlative of this change in magnetic flux. In this way, the sensor 46 is adapted to detect a condition of the vehicle seat assembly 10, such as whether or not it is occupied or whether the occupant is sitting in a certain position, based on the response of the sensor assembly 44. The signals generated by the sensor 46 are carried through the electric circuit 32 to the controller 40, which sends output to the restraint system 42 based on the signals generated by the sensor 46.

Turning now to FIG. 2, one embodiment of the low profile sensor assembly is generally indicated at 44. The low profile sensor assembly 44 generally includes a housing 48, having a base 50, an upper slide member 52, and an intermediate guide member 54 disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50 as will be described in greater detail below.

In the preferred embodiment illustrated in these figures, the base 50 includes a base guide 58, which is shaped like a hollow tube so as to define a wall 60 with a bore 62 extending axially therethrough. The upper slide member 52 includes an upper disc portion 64 and a support wall 66 extending axially downward from the outer circumference of the upper disc portion 64. The support wall 66 has a smaller diameter than the diameter of the intermediate guide member 54 such that the upper slide member 52 can move axially through the intermediate guide member 54. The biasing member 56 is disposed between the base 50 and the upper disc portion 64 of the upper slide member 52.

The intermediate guide member 54 is operatively supported for axial movement between the upper slide member 52 and the base 50. To this end, the intermediate guide member 54 is substantially tubular so as to define an outer surface 68 and an inner surface 70. The diameter of the intermediate guide member 54 is smaller than the diameter of the bore 62 of the base guide 58 such that the intermediate guide member 54 can move axially through the bore 62.

The intermediate guide member 54 includes a lower flange 72 formed on its lower end, and the base 50 includes an upper flange 74 formed on the upper end of the base guide 58. In the embodiment shown, the lower flange 72 of the intermediate guide member 54 extends radially outward, and the upper flange 74 of the base 50 extends radially inward. The diameter of the lower flange 72 is larger than the diameter of the upper flange 74. As such, the intermediate guide member 54 can be positioned within the bore 62 of the base guide 58. As the lower flange 72 of the intermediate guide member 54 slides toward the upper flange 74, the upper flange 74 interferes with the lower flange 72, thereby inhibiting further upward movement of the intermediate guide member 54. Thus, the upper flange 74 on the base 50 and the lower flange 72 on the intermediate guide member 54 cooperate to define the limit of sliding movement of the intermediate guide member 54 away from the base 50.

The upper slide member 52 includes a lower flange 76 formed on its lower end. On the other hand, the intermediate guide member 54 includes an upper flange 78 formed on its upper end. In the embodiment shown, the lower flange 76 of the upper slide member 52 extends radially outward, and the upper flange 78 of the intermediate guide member 54 extends radially inward. The diameter of the lower flange 76 is larger than the diameter of the upper flange 78. As such, the upper slide member 52 can be positioned within the intermediate guide member 54. As the lower flange 76 of the upper slide member 52 slides toward the upper flange 78 under the influence of the biasing force generated by the biasing member 56, the upper flange 78 interferes with the lower flange 76, thereby inhibiting further upward movement of the upper slide member 52. Thus, the upper flange 78 on the intermediate guide member 54 and the lower flange 76 on the upper slide member 52 cooperate to define the limit of sliding movement of the upper slide member 52 away from the base 50.

Furthermore, the upper slide member 52 includes a retainer 80 extending in the general direction of the base 50. In the embodiment shown, the retainer 80 is cup-shaped and extends from the center of the upper disc portion 64 of the upper slide member 52 in the direction of the base 50. In the embodiment shown in FIGS. 3 and 4, an emitter 82, such as a magnet, is operatively contained in and supported by the retainer 80.

As noted above, the vehicle occupant sensing system 28 further includes at least one sensor 46. As shown in FIGS. 2 and 3, the sensor 46 is operatively supported by the circuit carrier 34 adjacent the sensor assembly 44. In the embodiment shown here, the sensor 46 is positioned below the base 50 of the sensor assembly 44, above one of the terminal ends 36 of the electric circuit 32. The sensor 46 can be one of many types, including but not limited to a Hall effect sensor. If the sensor 46 is a Hall effect sensor, it detects the change in magnetic flux caused by the movement of the emitter 82 within the upper slide member 52 of the sensor assembly 44, and the sensor 46 generates a signal correlative of this change in magnetic flux. In this way, the sensor 46 is adapted to detect a condition of the vehicle seat assembly 10, such as whether or not it is occupied or whether the occupant is sitting in a certain position, based on the response of the sensor assembly 44. The signals generated by the sensor 46 are carried through the electric circuit 32 to the controller 40, which uses those signals to control the restraint system 42.

The weight of an occupant will deform the seat cushion 16 such that the lower surface 20 of the seat cushion 16 pushes the upper slide member 52 toward the base 50. As the upper slide member 52 moves, the sensor 46 detects an increase in magnetic flux density generated by the approaching emitter 82. In this way, the sensor 46 is operable to detect movement of the upper slide member 52 toward and away from the base 50. In turn, the sensor 46 generates a responsive signal indicative of the increase in flux density, and the controller 40 sends output to the restraint system 42 based on these signals. In the preferred embodiment, the sensor assemblies 44 are of the type described in detail in applicant's co-pending patent application Ser. No. 10/748,536, entitled "Vehicle Occupant Sensing System Having a Low Profile Sensor Assembly," and which is incorporated herein in its entirety by reference.

Figure 6:
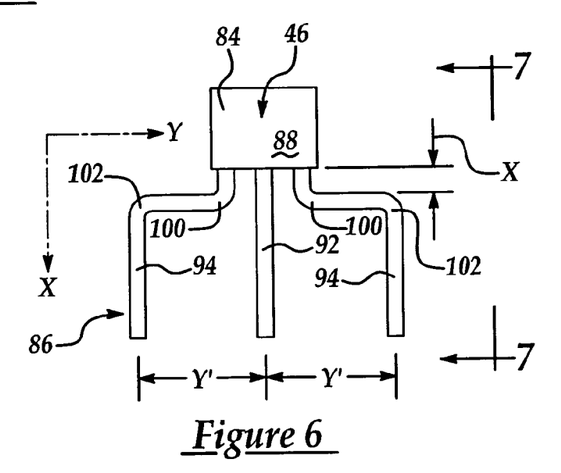
FIG. 6 is a top plan view of the sensor for the vehicle occupant sensing system of the present invention.
Figure 7:
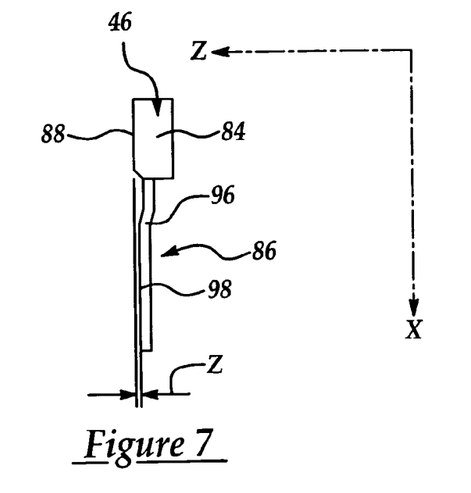
FIG. 7 is a side plan view of the sensor for the vehicle occupant sensing system of the present invention taken along line 7—7 of FIG. 6.

As shown in FIGS. 3, 6, and 7, each sensor 46 has a body 84 and a plurality of formed terminals, generally indicated at 86. The body 84 includes a collection of known electrical components coated with a polymer. The body 84 has a bottom surface 88, which is supported on an upper surface 90 of the circuit carrier 34. The number of terminals 86 of each sensor 46 corresponds to the number of leads 38 presented by each terminal end 36 of the electric circuit 32. Thus, in the embodiment shown, each sensor 46 has three terminals 86, including a power, ground, and signal terminal 86. The terminals 86 are arranged so as to define a middle terminal 92 and a plurality of outer terminals 94. The embodiment shown has one middle terminal 92 and two outer terminals 94 on opposing sides of the middle terminal 92.

In the preferred embodiment, the terminals 86 of the sensor 46 are formed in a predetermined fashion. As shown in FIGS. 6 and 7, for example, each terminal 86 is formed such that different portions of the terminals 86 are bent in the X-Y plane and in the Z-X plane depicted in the figures. It is noted that the X-, Y-, and Z-axes shown in FIGS. 6 and 7 are included for illustrative purposes only and do not limit the scope of the invention.

For example, with specific reference to FIG. 7, each of the terminals 86 extends out of the body 84 parallel to the X-axis, and at a predetermined location, each terminal 86 is bent in the Z-X plane to define a Z-axis bend 96. The Z-axis bend 96 defines a lower portion 98 of the terminal 86 which extends parallel to the X-axis and which is spaced a predetermined distance away from a plane defined by the bottom surface 88 of the body 84 of the sensor 46. This predetermined distance is represented by dimension Z in FIG. 7. In one embodiment, the predetermined distance Z between the lower portion 98 of the terminal 86 and the bottom surface 88 of the body 84 is at least 0.2 millimeters.

Also, the two outer terminals 94 include multiple bends in the X-Y plane. Specifically and with reference to FIG. 6, each of the outer terminals 94 extend out of the body 84 parallel to the X-axis, and a Y-axis bend 100 is formed such that the two outer terminals 94 extend away from each other, parallel to the Y-axis. The Y-axis bend 100 is formed at a predetermined location relative to the body 84. This predetermined location is represented by the dimension X in FIG. 6. In one embodiment, the predetermined location X of the Y-axis bend 100 is at least 0.96 millimeters relative to the body 84 of the sensor 46. Further away from the body 84, an X-axis bend 102 is formed on the outer terminals 94 at a predetermined location such that both of the outer terminals 94 extend in the same direction parallel to the X-axis. The X-axis bend 102 and Y-axis bend 100 provide the terminals 86 with a predetermined Y-axis spacing, which is represented by the dimension Y' in FIG. 6. In one embodiment, the Y-axis spacing Y' of the terminals 86 is at least 5.08 millimeters. In the preferred embodiment, the Y-axis spacing Y' of the terminals 86 corresponds to the Y-axis spacing Y of the leads 38 of the electric circuit 32 to allow the terminals 86 to be vertically aligned with the leads 38. As will be described in greater detail below, the terminals 86 are formed in this manner to facilitate assembly of the vehicle occupant sensing system and to avoid damaging the terminals 86 during assembly.

Figure 4:
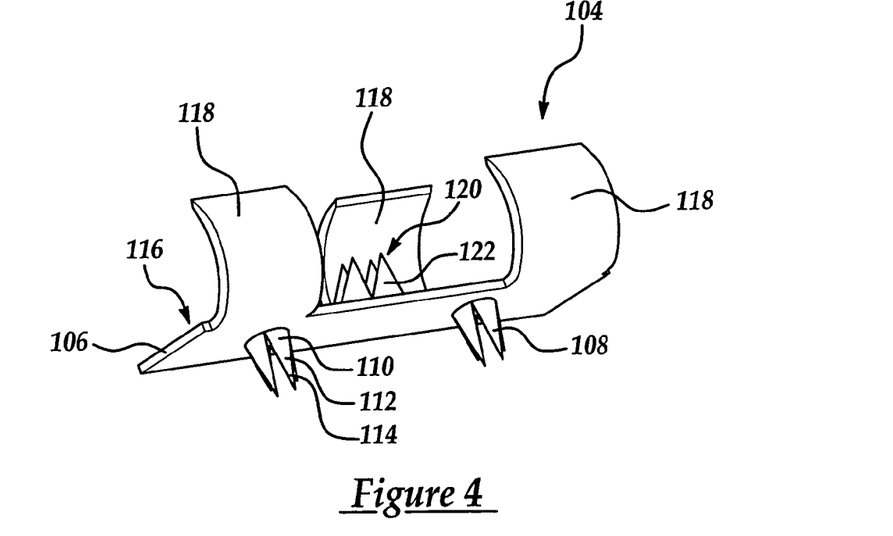
FIG. 4 is a bottom perspective view of a conductive connector used in the vehicle occupant sensing system of FIG. 1.

The vehicle occupant sensing system 28 also includes a plurality of conductive connectors, generally indicated in FIG. 3 at 104. Each conductive connector 104 is associated with the corresponding pair of terminals 86 and leads 38. A typical conductive connector 104 is shown in detail in FIG. 4. Each conductive connector 104 is made out of an electrically conductive material. The conductive connectors 104 each include a flat body 106 with a top end 116 and at least one deformable blade 108 extending from the bottom of the body 106. Each deformable blade 108 defines a first portion 110 nearest the body 106, a second portion 112 near the middle of the blade 108, and a third portion 114 furthest from the body 106 and formed into a sharp tip as is shown in FIGS. 4 and 5C. In the embodiment shown, the conductive connector 104 includes eight deformable blades 108, arranged in two spaced circular groups of four blades 108.

Also, the conductive connector 104 includes at least one arm 118 extending from the side of the body 106, and in the preferred embodiment shown here, the conductive connector 104 includes three arms 118. Two of the arms 118 extend from one side of the conductive connector 104 while another arm 118 extends from an opposite side of the conductive connector 104. The conductive connector 104 also has a bending member, generally indicated at 120. In the preferred embodiment, the bending member 120 includes a circular arrangement of four prongs 122 extending from the top end 116 of the body 106 of the conductive connector 104.

As shown in FIGS. 3, a single conductive connector 104 is positioned near each terminal 86 of each sensor 46. The body 106 of each conductive connector 104 is supported on the upper surface 90 of the circuit carrier 34 such that the top end 116 of the conductive connector 104 is spaced away from the upper surface 90 of the circuit carrier 34. The body 106, arms 118, and bending member 120 are disposed for electrical communication with the associated terminal 86. Specifically, the lower portions 98 of the formed terminals 86 are each supported by the top end 116 of corresponding ones of the conductive connectors 104. Also, the arms 118 and bending member 120 electrically and mechanically attach the conductive connector 104 to the corresponding terminal 86, and the deformable blades 108 extend into the circuit carrier 34 and into electrical communication with the associated lead 38 of the electric circuit 32, thereby mechanically attaching the conductive connector 104 to the circuit carrier 34 while providing electrical communication between the sensor 46 and the electric circuit 32.

FIGS. 3, 5A–5C, 6, and 7 illustrate one embodiment of a method of manufacturing the vehicle occupant sensing system 28. First, the method involves forming the terminals 86 of the sensor 46. For example, the terminals 86 are formed with the Z-axis bend 96 such that the lower portion 98 of each of the terminals 86 is spaced a predetermined distance Z away from a plane defined by the bottom surface 88 of the body 84 of the sensor 46. In one embodiment, this first step also involves forming the outer terminals 94 with the Y-axis bend 100 and the X-axis bend 102 shown in FIG. 6. The Y-axis bend 100 and X-axis bend 102 provide the terminals 86 with a Y-axis spacing Y' that corresponds to the Y-axis spacing Y of the leads 38 of the electric circuit 32. Forming the terminals 86 can occur in any effective manner, such as by a bending process, and the different bends 96, 100, 102 can be formed in any effective order. As will be described in greater detail below, this first step of forming the terminals 86 facilitates assembly of the vehicle occupant sensing system 28 and also inhibits damage to the terminals 86 during assembly.

The method continues by electrically attaching the conductive connectors 104 to the leads 38 of the electric circuit 32 and mechanically attaching the conductive connectors 104 to the circuit carrier 34. More specifically, this second step involves extending each blade 108 into and through the circuit carrier 34 and into electrical communication with the associated lead 38 of the electric circuit 32 such that the body 106 of the conductive connector 104 is supported on the upper surface 90 of the circuit carrier 34 and the top end 116 of the conductive connector 104 is spaced away from the upper surface 90 of the circuit carrier.

Figure 5A:
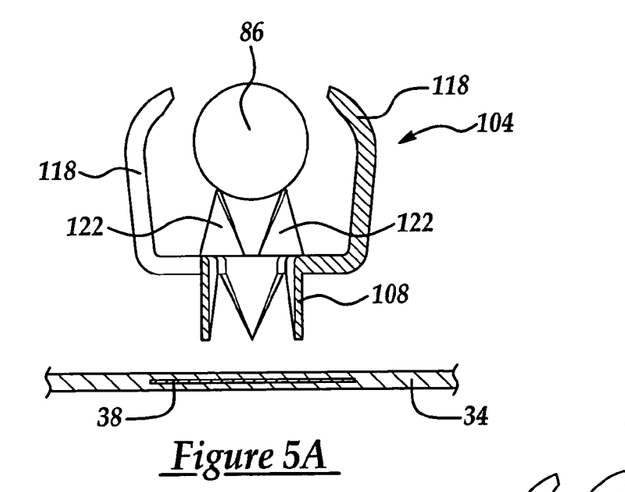
FIG. 5A is a cross-sectional side view of the conductive connector shown prior to attachment to a circuit carrier of the vehicle occupant sensing system of the present invention.
Figure 5B:
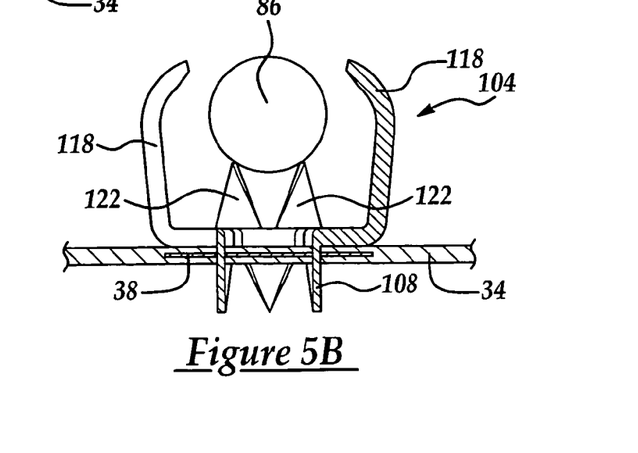
FIG. 5B is a cross-sectional side view of the conductive connector illustrating the deformable blades after they have initially pierced the circuit carrier of the vehicle occupant sensing system of the present invention.
Figure 5C:
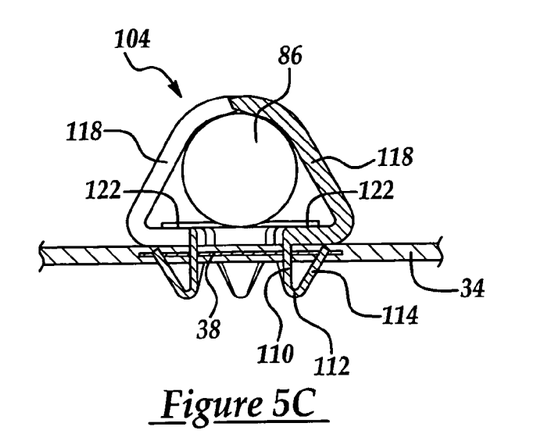
FIG. 5C is a cross-sectional side view of the conductive connector fully attached to the circuit carrier of the vehicle occupant sensing system of the present invention.

More specifically, as shown in FIGS. 5A–5C, the body 106 of the conductive connector 104 is arranged such that the blades 108 are pointed toward the circuit carrier 34. The body 106 is then pressed into the circuit carrier 24, and the blades 108 are sufficiently sharp enough to pierce and extend completely through the circuit carrier 34 and the associated lead 38 encapsulated therein. Subsequently, each blade 108 is bent outward from each other and upward toward the underside of the circuit carrier 34. This bending process is completed by known means such as through the use of an actuating anvil. Bending the blade 108 in this manner causes the blade 108 to re-pierce the circuit carrier 34 and establish a second point of electrical communication with the associated lead 38. Thus, as seen in FIG. 5C, the first portion 110 of each blade 108 extends into and through the circuit carrier 34 and into electrical communication with the associated lead 38 of the electric circuit 32. Also, the second portion 112 of each blade 108 is bent such that the third portion 114 extends into the circuit carrier 34 and into electrical communication with the associated lead 38 of the electric circuit 32.

Next, the prongs 122 of the bending member 120 are flattened against the top end 116 of the conductive connector 104. In one embodiment, a single tool (not shown) flattens the prongs 122 as the blades 108 of the conductive connector 104 are inserted into the circuit carrier 34, and the prongs 122 are flattened against the top end 116 such that the top end 116 is substantially uniform and flat.

Once the conductive connector 104 is attached, the method of assembly continues by electrically attaching at least one of the formed terminals 86 to at least one of the conductive connectors 104. Specifically, as shown in FIG. 3, the bottom surface 88 of the associated body 84 is supported on the upper surface 90 of the circuit carrier 34, and the lower portion 98 of the terminal 86 of the associated sensor 46 is positioned against the top end 116 of the conductive connector 104. Also, although the body 84 of the sensor 46 rests on the circuit carrier 34, the Z-axis bend 96 positions the terminal 86 at a height approximately equal to the top end 116 of the conductive connector 104. Also, the X-axis and Y-axis bends 100, 102 of the outer terminals 94 provide the terminals 86 with Y-axis spacing Y' that is approximately equal to the spacing of the associated leads 38 of the electric circuit 32 such that the terminals 86 are substantially vertically aligned with the leads 38. Thus, forming the terminals 86 advantageously facilitates positioning of the sensor 46 relative to the conductive connectors 104.

Then, the arms 118 of the conductive connector 104 are each bent around the terminal 86 as is shown in FIGS. 3 and 5C. As such, the arms 118 and the top end 116 of the conductive connector 104 apply a compressive force on the associated terminal 86, thereby cooperatively establishing mechanical and electrical communication with the associated terminal 86. As mentioned above, the Z-axis bend 96 allows the terminal 86 to be in contact with the top end 116 of the conductive connector 104 while the body 84 of the sensor 46 rests on the circuit carrier 34, and as such, the terminal 86 is largely supported by the top end 116 of the conductive connector 104 when the arm 118 is bent around the terminal 86. Support of the terminal 86 in this manner reduces stress on the terminal 86 that would otherwise occur when the arm 118 bends over the terminal 86. Advantageously, the terminal 86 is less likely to be damaged during this step of assembly. Also, in one embodiment, the Y-axis spacing Y' of the terminals provides clearance for tooling (not shown) to automatically bend all the arms 118 over the respective terminals 86 of one sensor 46 at one time.

In another embodiment, the sequence of steps of the assembly method is changed. Specifically, in this embodiment, the terminals 86 are formed as shown in FIGS. 6 and 7. Then, the terminals 86 are electrically and mechanically attached to the conductive connectors 104 by bending the arms 118 of the conductive connector 104 around the respective terminal 86. Next, the conductive connector 104 is electrically connected to the respective lead 38 and mechanically attached to the circuit carrier 34 by extending the blades 108 of the conductive connector 104 into the circuit carrier 34 and into electrical communication with the associated lead 38.

In summary, forming the terminals 86 of the sensor 46 facilitates assembly of the vehicle occupant sensing system 28 and reduces the likelihood of damaging the terminals 86 of the sensor 46. For example, forming the terminals 86 with an X-axis bend 102 and a Y-axis bend 100 spaces the terminals 86 according to the spacing of the leads 38 of the electric circuit 32, and as such, when the sensor 46 is positioned on the circuit carrier 34, the terminals 86 are substantially vertically aligned with the respective leads 38. Such alignment ensures proper attachment using the conductive connectors 104. Moreover, in the preferred embodiment, this spacing provides room for tooling (not shown) to attach the conductive connectors 104 in an efficient manner. Additionally, by forming the terminals 86 with a Z-axis bend 96, the terminals 86 come to rest on the conductive connectors 104 while the sensor body 84 is positioned on the circuit carrier 34. As such, when the arm 118 of the conductive connector 104 is bent over the respective terminal 86, the top end 116 of the conductive connector 104 supports the terminal 86 to thereby inhibit damage to the terminal 86 when the arm 118 is bent over the respective terminal 86.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle occupant sensing system for detecting a condition of a vehicle seat, said vehicle occupant sensing system comprising:
   a circuit carrier with an upper surface;
   an electric circuit supported by said circuit carrier, said electric circuit presenting a plurality of leads;
   at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to movement of said vehicle seat;
   a sensor adapted to detect the condition of the vehicle seat, said sensor having a body with a bottom surface that is supported by said upper surface of said circuit carrier, and having a plurality of formed terminals corresponding to said plurality of leads presented by said electric circuit, wherein each of said plurality of formed terminals is spaced a predetermined distance away from a plane defined by said bottom surface of said body; and
   a plurality of conductive connectors associated with said corresponding plurality of formed terminals and leads, said conductive connectors operatively supporting said terminals and establishing electrical communication between said terminals and said leads.

2. A vehicle occupant sensing system as set forth in claim 1, wherein said conductive connectors each include at least one deformable blade extending into said circuit carrier and into electrical communication with the associated lead of said electric circuit.

3. A vehicle occupant sensing system as set forth in claim 2, wherein said at least one deformable blade includes a first portion, a second portion and a third portion, and wherein said first portion extends into and through said circuit carrier and into electrical communication with the associated lead of said electric circuit, and said second portion is bent such that said third portion extends into said circuit carrier and into electrical communication with the associated lead of said electric circuit.

4. A vehicle occupant sensing system as set forth in claim 1, wherein said conductive connectors each include a body supported on said upper surface of said circuit carrier and a top end spaced away from said upper surface of said circuit carrier, wherein said lower portions of said formed terminals are each supported by said top end of corresponding ones of said conductive connectors.

5. A vehicle occupant sensing system as set forth in claim 1, wherein said leads of said electric circuit have a Y-axis spacing, and wherein said formed terminals have a predetermined Y-axis spacing corresponding to said Y-axis spacing of said leads of said electric circuit.

6. A vehicle occupant sensing system as set forth in claim 1, wherein said sensor has a plurality of outer formed terminals which have a Y-axis bend, wherein said Y-axis bend is formed at a predetermined location relative to said body of said sensor.

7. A method of assembling a vehicle occupant sensing system for detecting a condition of a vehicle seat, the vehicle occupant sensing system comprising:
   a circuit carrier with an upper surface;
   an electric circuit supported by said circuit carrier, said electric circuit presenting a plurality of leads;
   at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to movement of said vehicle seat;
   a sensor adapted to detect the condition of the vehicle seat, said sensor having a body with a bottom surface and having a plurality of terminals corresponding to said plurality of leads presented by said electric circuit; and
   a plurality of conductive connectors associated with said corresponding plurality of terminals and leads;
   wherein said method of assembly comprises the steps of:
   a) forming said terminals until spaced a predetermined distance away from a plane defined by said bottom surface of said body;
   b) electrically attaching said conductive connectors to corresponding ones of said leads; and
   c) electrically attaching said terminals to corresponding ones of said conductive connectors.

8. A method of assembling a vehicle occupant sensing system as set forth in claim 7, wherein step (b) involves extending at least one deformable blade formed on said conductive connector into said circuit carrier and into electrical communication with the associated lead of said electric circuit.

9. A method of assembling a vehicle occupant sensing system as set forth in claim 8, wherein step (b) comprises the steps of:

1) extending a first portion of said at least one blade into and through said circuit carrier and into electrical communication with the associated lead of said electric circuit;
2) bending a second portion of said at least one blade; and
3) extending a third portion of said at least one blade into said circuit carrier and into electrical communication with the associated lead of said electric circuit.

10. A vehicle occupant sensing system as set forth in claim 7, wherein step (c) involves supporting a body of said conductive connector on said upper surface of said circuit carrier such that a top end of said conductive connector is spaced away from said upper surface of said circuit carrier, and operatively supporting said terminals on said top end of corresponding ones of said conductive connectors.

11. A method of assembling a vehicle occupant sensing system as set forth in claim 7, wherein step (a) further involves forming said terminals to have a predetermined Y-axis spacing corresponding to a Y-axis spacing of said leads of said electric circuit.

12. A method of assembling a vehicle occupant sensing system as set forth in claim 7, wherein step (a) further involves forming a Y-axis bend in said terminal at a predetermined location relative to said body of said sensor.

13. A method of assembling a vehicle occupant sensing system for detecting a condition of a vehicle seat, the vehicle occupant sensing system comprising:
   a circuit carrier with an upper surface;
   an electric circuit supported by said circuit carrier, said electric circuit presenting a plurality of leads;
   at least one low profile sensor assembly having a housing that includes a fixed base, an upper slide member, and at least one intermediate guide member disposed between said upper slide member and said base, said upper slide member and said at least one intermediate guide member supported for movement toward and away from said fixed base in response to movement of said vehicle seat;
   a sensor adapted to detect the condition of the vehicle seat, said sensor having a body with a bottom surface and having a plurality of terminals corresponding to said plurality of leads presented by said electric circuit; and
   a plurality of conductive connectors associated with said corresponding plurality of terminals and leads;

wherein said method of assembly comprises the steps of:
a) forming said terminals until spaced a predetermined distance away from a plane defined by said bottom surface of said body;
b) electrically attaching said terminals to corresponding ones of said conductive connectors; and
c) electrically attaching said conductive connectors to corresponding ones of said leads.

14. A method of assembling a vehicle occupant sensing system as set forth in claim 13, wherein step (c) involves extending at least one deformable blade formed on said conductive connector into said circuit carrier and into electrical communication with the associated lead of said electric circuit.

15. A method of assembling a vehicle occupant sensing system as set forth in claim 14, wherein step (c) comprises the steps of:
1) extending a first portion of said at least one blade into and through said circuit carrier and into electrical communication with the associated lead of said electric circuit;
2) bending a second portion of said at least one blade; and
3) extending a third portion of said at least one blade into said circuit carrier and into electrical communication with the associated lead of said electric circuit.

16. A vehicle occupant sensing system as set forth in claim 13, wherein step (b) involves supporting a body of said conductive connectors on said upper surface of said circuit carrier such that a top end of said conductive connector is spaced away from said upper surface of said circuit carrier, and operatively supporting said terminals on said top end of corresponding ones of said conductive connectors.

17. A method of assembling a vehicle occupant sensing system as set forth in claim 13, wherein said step (a) further involves forming said terminals to have a predetermined Y-axis spacing corresponding to a Y-axis spacing of said leads of said electric circuit.

18. A method of assembling a vehicle occupant sensing system as set forth in claim 13, wherein said step (a) further involves forming a Y-axis bend in said terminals at a predetermined location relative to said body of said sensor.

* * * * *